United States Patent
Peng et al.

(10) Patent No.: US 11,411,504 B1
(45) Date of Patent: Aug. 9, 2022

(54) VOLTAGE TRANSFORMING DEVICE

(71) Applicant: Chicony Power Technology Co., Ltd., New Taipei (TW)

(72) Inventors: Tso-Jen Peng, New Taipei (TW); Ssu Hao Wang, New Taipei (TW)

(73) Assignee: Chicony Power Technology Co., Ltd., New Taipei (TW)

(*) Notice: Subject to any disclaimer, the term of this patent is extended or adjusted under 35 U.S.C. 154(b) by 0 days.

(21) Appl. No.: 17/368,834

(22) Filed: Jul. 7, 2021

(30) Foreign Application Priority Data

May 7, 2021 (TW) ................................. 110116474

(51) Int. Cl.
*H02M 3/335* (2006.01)
*H02M 3/00* (2006.01)

(52) U.S. Cl.
CPC ......... *H02M 3/33576* (2013.01); *H02M 3/01* (2021.05); *H02M 3/33507* (2013.01); *H02M 3/33569* (2013.01); *H02M 3/33592* (2013.01)

(58) Field of Classification Search
CPC ............... H02M 3/33576; H02M 3/01; H02M 3/33507; H02M 3/33569
See application file for complete search history.

(56) References Cited

U.S. PATENT DOCUMENTS

| | | | |
|---|---|---|---|
| 6,115,276 A * | 9/2000 | Mao | H02J 9/062 363/127 |
| 6,297,972 B1 * | 10/2001 | Chen | H02J 9/062 307/64 |
| 7,173,833 B2 * | 2/2007 | Lin | H02M 3/285 363/16 |
| 8,569,963 B2 | 10/2013 | Walters | |
| 8,610,409 B2 | 12/2013 | Orr | |
| 8,970,194 B2 | 3/2015 | Li | |
| 8,970,198 B2 | 3/2015 | Huber et al. | |
| 9,144,856 B2 | 9/2015 | Vogel | |
| 9,450,496 B2 | 9/2016 | Sigamani et al. | |
| 9,490,706 B2 | 11/2016 | Balakrishnan et al. | |
| 9,621,028 B2 | 4/2017 | Lin et al. | |
| 10,079,541 B1 * | 9/2018 | Taban | H02M 3/33546 |
| 10,224,802 B1 * | 3/2019 | Chakkirala | H02M 3/33569 |
| 10,389,233 B1 | 8/2019 | Lim | |
| 2007/0181547 A1 * | 8/2007 | Vogel | B23K 9/1081 219/130.1 |
| 2008/0055941 A1 * | 3/2008 | Victor | H02M 7/53832 363/21.02 |
| 2010/0165684 A1 * | 7/2010 | Chen | H02M 7/217 363/127 |

(Continued)

FOREIGN PATENT DOCUMENTS

| | | |
|---|---|---|
| CN | 106451696 | 2/2017 |
| CN | 110504847 | 11/2019 |

(Continued)

*Primary Examiner* — Yusef A Ahmed
(74) *Attorney, Agent, or Firm* — JCIPRNET

(57) ABSTRACT

A voltage transforming device is provided. The voltage transforming device boosts an input voltage to generate a boosted voltage in response to a voltage demand from an external device. The voltage transforming device converts the boosted voltage to provide a converted voltage based on a fixed gain condition. In addition, the voltage transforming device converts the converted voltage to provide an output voltage in response to the voltage demand.

19 Claims, 6 Drawing Sheets

(56) References Cited

U.S. PATENT DOCUMENTS

| | | | | |
|---|---|---|---|---|
| 2010/0237793 | A1* | 9/2010 | Hasegawa | H05B 41/388 315/224 |
| 2012/0106206 | A1* | 5/2012 | Tang | H02M 3/3376 363/21.02 |
| 2012/0170322 | A1* | 7/2012 | Thomas | H02M 3/33569 363/16 |
| 2013/0334893 | A1* | 12/2013 | Takahashi | H02J 50/70 307/104 |
| 2014/0160805 | A1* | 6/2014 | Oh | H02M 7/217 363/21.02 |
| 2014/0211515 | A1* | 7/2014 | Tomioka | H02M 3/33569 363/21.02 |
| 2015/0380948 | A1* | 12/2015 | Mazaki | H02M 3/33573 307/104 |
| 2016/0016479 | A1* | 1/2016 | Khaligh | H01F 38/08 336/170 |
| 2016/0079872 | A1* | 3/2016 | Ryu | H02M 3/156 363/21.04 |
| 2016/0141951 | A1* | 5/2016 | Mao | H02M 1/36 363/21.02 |
| 2016/0352234 | A1* | 12/2016 | Imai | H02M 3/158 |
| 2018/0041108 | A1* | 2/2018 | Tanaka | H02M 1/083 |
| 2019/0115837 | A1* | 4/2019 | Fahlenkamp | H02M 3/33507 |
| 2019/0238128 | A1* | 8/2019 | Chuang | H03K 17/6871 |
| 2020/0076315 | A1* | 3/2020 | Peng | H02M 3/33576 |
| 2020/0251992 | A1* | 8/2020 | Peng | H02M 3/3353 |
| 2022/0014093 | A1* | 1/2022 | Ammar | H02M 3/07 |

FOREIGN PATENT DOCUMENTS

| | | |
|---|---|---|
| TW | 201027892 | 7/2010 |
| TW | I468908 | 1/2015 |
| TW | I670919 | 9/2019 |

* cited by examiner

VOLTAGE TRANSFORMING DEVICE

CROSS-REFERENCE TO RELATED APPLICATION

This application claims the priority benefit of Taiwan application serial no. 110116474, filed on May 7, 2021. The entirety of the above-mentioned patent application is hereby incorporated by reference herein and made a part of this specification.

BACKGROUND

Technical Field

The disclosure relates to a voltage transforming device, and in particular to a voltage transforming device that achieves both gain and efficiency.

Description of Related Art

In order to meet power factor specifications stipulated in relevant energy regulations, a power factor correction (PFC) circuit is often used to meet power factor specifications (such as the ENERGY STAR specification). Generally, the power factor (or efficiency) can be improved by a boost converter, and the output voltage can be maintained at a fixed high voltage level under different input voltages. For example, in an application range where the input voltage is 90V to 264V, the power factor can be increased by a boost converter, and the output voltage can be fixed at a voltage level of 390V. The fixed high voltage level enables a next-level converter to achieve a design of the best efficiency and gain.

With the popularization of power delivery (PD) applications, the output voltage may be variable. However, based on the demand of changeable output voltage, it is difficult for a current power factor correction circuit and a circuit configuration of a converter to achieve both gain of voltage and high efficiency. In other words, for the circuit configuration as described above to improve efficiency, gain of voltage will be insufficient. For the circuit configuration as described above to achieve the expected gain of the power source, efficiency will be reduced. Therefore, in power delivery applications, developing a design that achieves both gain and efficiency has become an important issue for those skilled in the art.

SUMMARY

The disclosure provides a voltage transforming device. The voltage transforming device of the disclosure achieves voltage gain and maintains high efficiency under different output voltage demands.

A voltage transforming device of the disclosure includes a primary circuit, an LLC converter, and a secondary circuit. The primary circuit includes a first rectifying and filtering circuit, a primary controller, and a boost converter. The first rectifying and filtering circuit rectifies and filters an input voltage to provide an adjusted input voltage. The primary controller is coupled to the first rectifying and filtering circuit. The primary controller provides a boost control signal in response to the first feedback control signal. The boost converter is coupled to the first rectifying and filtering circuit and the primary controller. The boost converter boosts the adjusted input voltage to generate a boosted voltage in response to the boost control signal. The LLC converter is coupled to boost converter. The secondary circuit includes a secondary feedback controller, a second rectifying and filtering circuit, and a buck converter. The secondary feedback controller receives a voltage demand and provides the first feedback control signal and a buck control signal in response to the voltage demand. The second rectifying and filtering circuit is coupled to the LLC converter. The second rectifying and filtering circuit and the LLC converter jointly convert the boosted voltage based on a fixed gain condition to provide a converted voltage. The buck converter is coupled to the second rectifying and filtering circuit. The buck converter converts the converted voltage to provide an output voltage in response to the buck control signal.

Based on the above, the voltage transforming device uses the boost converter, the LLC converter, and the buck converter to generate the output voltage that meets the voltage demand and maintain high efficiency. In this way, the voltage transforming device of the disclosure achieves voltage gain and maintains high efficiency under different output voltage demands.

In order to further describe the features and advantages of the disclosure as described above, embodiments accompanied with drawings are described below in details.

DESCRIPTION OF THE EMBODIMENTS

Part of the embodiments of the disclosure will be described in detail in connection with the accompanying drawings. Same element symbols in the following description refer to same or like elements in different drawings. The embodiments are only part of the disclosure and do not disclose all the implementation methods of the disclosure. Specifically, the embodiments are examples of the claims of the disclosure.

Figure 1:
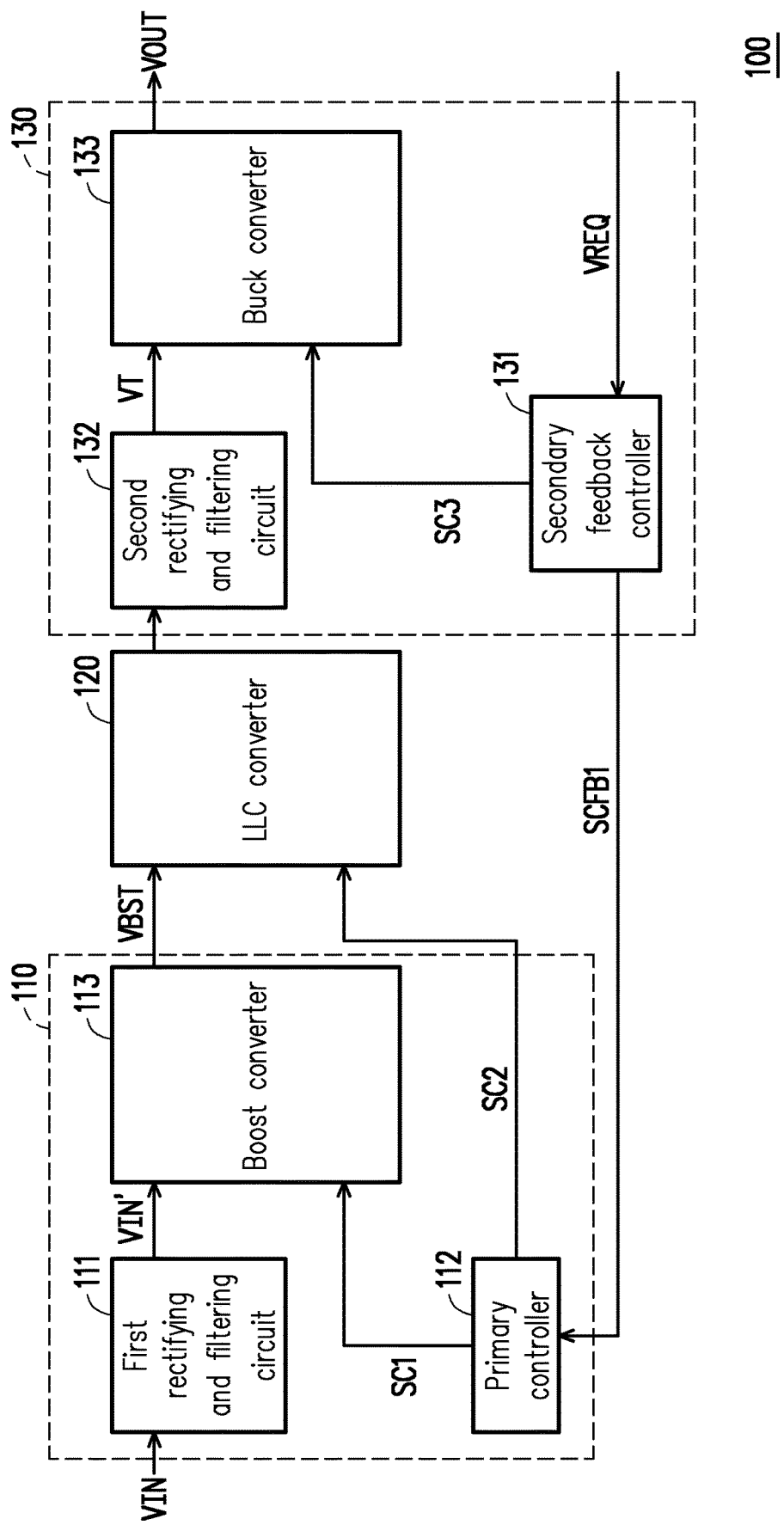
FIG. 1 illustrates a schematic diagram of a voltage transforming device according to the first embodiment of the disclosure.

Referring to FIG. 1, FIG. 1 illustrates a schematic diagram of a voltage transforming device according to the first embodiment of the disclosure. In this embodiment, a voltage transforming device 100 may convert an input voltage VIN into an output voltage VOUT corresponding to an external voltage demand VREQ. For example, the voltage demand VREQ is provided by an electronic device connected to the voltage transforming device 100.

In this embodiment, the voltage transforming device 100 includes a primary circuit 110, an LLC converter 120, and a secondary circuit 130. The primary circuit 110 includes a first rectifying and filtering circuit 111, a primary controller 112, and a boost converter 113. The first rectifying and filtering circuit 111 rectifies and filters the input voltage VIN to provide an adjusted input voltage VIN'. For example, the first rectifying and filtering circuit 111 may include any type of rectifier and filter. The rectifier may be, for example, a full-bridge rectifier or a half-bridge rectifier. The filter may filter out the noise of the input voltage VIN. The primary controller 112 is coupled to the first rectifying and filtering circuit 111. In response to a first feedback control signal SCFB1, the primary controller 112 provides a boost control signal SC1. The boost converter 113 is coupled to the first rectifying and filtering circuit 111 and the primary controller 112. In response to the boost control signal SC1, the boost converter 113 boosts the adjusted input voltage VIN' to generate a boosted voltage VBST.

In this embodiment, the LLC converter 120 is coupled to the boost converter 113. In this embodiment, in response to the first feedback control signal SCFB1, the primary controller 112 provides a conversion control signal SC2. The LLC converter 120 operates based on the conversion control signal SC2.

In this embodiment, the secondary circuit 130 includes a secondary feedback controller 131, a second rectifying and filtering circuit 132, and a buck converter 133. In this embodiment, the secondary feedback controller 131 receives the external voltage demand VREQ, and in response to the voltage demand VREQ, provides the first feedback control signal SCFB1 and a buck control signal SC3. In other words, the secondary feedback controller 131 uses the first feedback control signal SCFB1 to control the primary controller 112 and the LLC converter 120. The second rectifying and filtering circuit 132 is coupled to the LLC converter 120. For example, the second rectifying and filtering circuit 132 may include any type of rectifier and filter. The rectifier may be, for example, a half-bridge rectifier. The filter may filter out the noise of the voltage signal provided by the LLC converter 120. In addition, the second rectifying and filtering circuit 132 and the LLC converter 120 jointly convert the boosted voltage VBST based on a fixed gain condition to provide a converted voltage VT.

For example, the secondary feedback controller 131 provides the first feedback control signal SCFB1 based on the gain condition. Based on the first feedback control signal SCFB1, the LLC converter 120 and the second rectifying and filtering circuit 132 may jointly provide the converted voltage VT. Compared with the converted voltage VT, the boosted voltage VBST has a fixed gain. It should be noted that the fixed gain allows the voltage transforming device 100 to maintain high efficiency. In this way, the voltage transforming device 100 may maintain high efficiency based on the joint operation of the boost converter 113, the LLC converter 120, and the second rectifying and filtering circuit 132. In some embodiments, the fixed gain may be generated by the LLC converter 120 alone. In other words, the second rectifying and filtering circuit 132 may not participate in any buck-boost operations.

For example, the LLC converter 120 includes a primary coil and a secondary coil. The number of turns of the primary coil is N times the number of turns of the secondary coil. The gain condition conforms to the following formula:

$$M = 2 \times N \times (V2/V1)$$

In the above formula, M is the gain condition. V1 is the voltage value of the input terminal (i.e., the voltage value of the boosted voltage VBST). V2 is the voltage value of the output terminal (i.e., the voltage value of the converted voltage VT). N is the ratio of the number of turns of the primary coil to the number of turns of the secondary coil. For example, the gain condition is designed to be equal to 1 (the disclosure is not limited thereto) to maintain better efficiency. Therefore, when the number of turns of the primary coil is 10 times the number of turns of the secondary coil, the voltage value of the input terminal is controlled to be 20 times the voltage value of the output terminal. Therefore, in this example, in order to maintain better efficiency, the voltage value of the converted voltage VT is controlled to be 0.05 times the voltage value of the boosted voltage VBST.

In this embodiment, the buck converter 133 is coupled to the second rectifying and filtering circuit 132. The buck converter 133 converts the converted voltage VT in response to the buck control signal SC3 to provide the output voltage VOUT. In this way, the voltage transforming device 100 may generate the output voltage VOUT corresponding to the voltage demand VREQ based on the voltage demand VREQ. In addition, based on the gain condition, no matter what the output voltage VOUT is, high efficiency of the voltage transforming device 100 may be maintained.

Incidentally, based on the joint operation of the primary circuit 110, the LLC converter 120, and the secondary circuit 130, the voltage transforming device 100 may provide the output voltage VOUT that meets any voltage demand VREQ for power delivery applications.

Compared with a conventional configuration, the voltage transforming device 100 does not need a plurality of transformer elements to meet the various output voltages VOUT of the power delivery applications. Therefore, compared with the conventional configuration, the volume of the voltage transforming device 100 is smaller.

Figure 2:
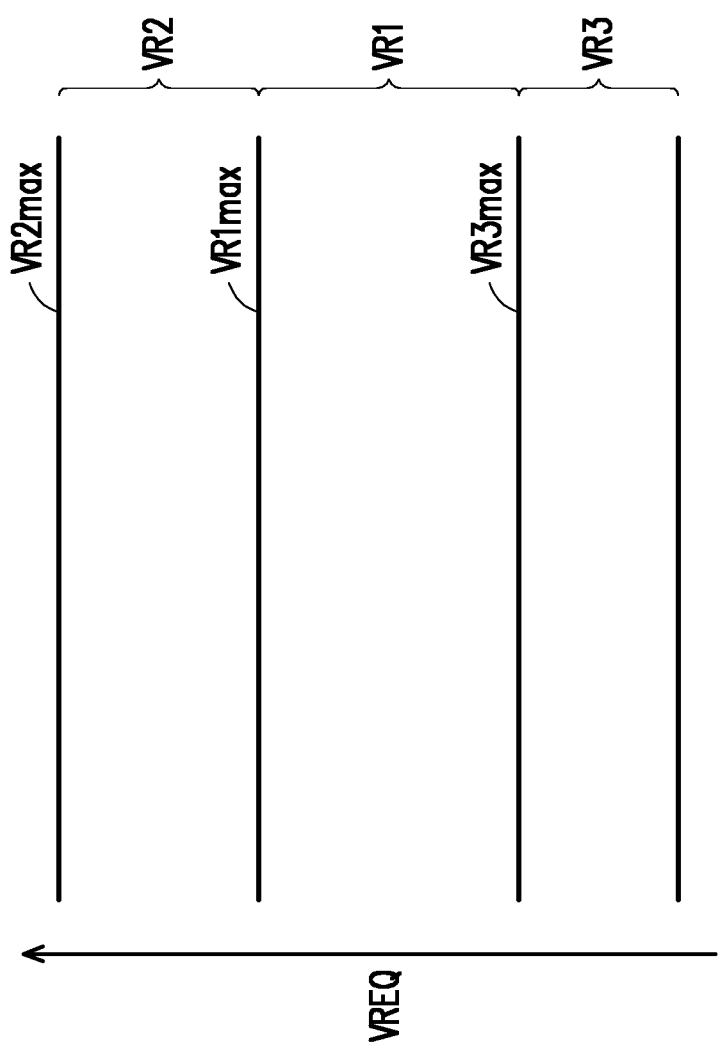
FIG. 2 illustrates a schematic diagram of a required voltage value range according to an embodiment of the disclosure.

Referring to FIGS. 1 and 2, FIG. 2 illustrates a schematic diagram of a required voltage value range according to an embodiment of the disclosure. In this embodiment, the secondary feedback controller 131 determines that the voltage value of the output voltage VOUT is in one of required voltage value ranges VR1 to VR3 based on the voltage demand VREQ to derive a determination result. The secondary feedback controller 131 further provides the first feedback control signal SCFB1 and buck control signal SC3 based on the determination result.

In this embodiment, the required voltage value range VR1 is lower than the required voltage value range VR2. The required voltage value range VR1 is higher than the required voltage value range VR3. In this embodiment, when the voltage demand VREQ indicates that the voltage value of the output voltage VOUT is maintained in the required voltage value range VR1, the secondary feedback controller 131 provides the corresponding first feedback control signal SCFB1. In response to the first feedback control signal SCFB1, the primary circuit 110 maintains the voltage value of the boosted voltage VBST. In other words, when the voltage demand VREQ indicates that the voltage value of the output voltage VOUT is maintained in the required voltage value range VR1, in response to the boost control signal SC1, the boost converter 113 maintains the voltage value of the boosted voltage VBST.

When the voltage demand VREQ indicates that the voltage value of the output voltage VOUT needs to be lowered and maintained in the same required voltage value range VR1, in response to the boost control signal SC1, the boost converter 113 maintains the voltage value of the boosted voltage VBST. In addition, in response to the buck control signal SC3, the buck converter 133 to step down the converted voltage VT. Therefore, the voltage value of the output voltage VOUT is maintained in the required voltage value range VR1, and is lowered to meet the voltage demand VREQ.

When the voltage demand VREQ indicates that the voltage value of the output voltage VOUT is a maximum value VR1max in the same required voltage value range VR1, in response to the boost control signal SC1, the boost converter 113 maintains the voltage value of the boosted voltage VBST. In addition, in response to the buck control signal SC3, the buck converter 133 does not step down the converted voltage VT. Therefore, the voltage value of the output voltage VOUT is controlled at the maximum value VR1max in the required voltage value range VR1.

In other words, the converted voltage VT is roughly equal to the maximum value in one of the required voltage value ranges VR1 to VR3.

In this embodiment, when the voltage demand VREQ indicates that the voltage value of the output voltage VOUT needs to be increased from the required voltage value range VR1 to the required voltage value range VR2, the secondary feedback controller 131 provides the corresponding first feedback control signal SCFB1 and the buck control signal SC3. In response to the first feedback control signal SCFB1, the primary circuit 110 increases the voltage value of the boosted voltage VBST. Therefore, in response to the boost control signal SC1, the boost converter 113 increases the voltage value of the boosted voltage VBST from the required voltage value range VR1 to the required voltage value range VR2.

Furthermore, when the voltage demand VREQ indicates that the voltage value of output voltage VOUT needs to be increased from the required voltage value range VR1 to the maximum value VR2max in the required voltage value range VR2, in response to the buck control signal SC3, the buck converter 133 does not step down the converted voltage VT. On the other hand, when the voltage demand VREQ indicates that the voltage value of the output voltage VOUT needs to be increased to the required voltage value range VR2 and be lower than the maximum value VR2max in the required voltage value range VR2, in response to the buck control signal SC3, the buck converter 133 steps down the converted voltage VT.

In this embodiment, when the voltage demand VREQ indicates that the voltage value of the output voltage VOUT needs to be reduced from the required voltage value range VR1 to the required voltage value range VR3, in response to the boost control signal SC1, the boost converter 113 reduces the voltage value of the boosted voltage VBST. Therefore, the voltage value of the boosted voltage VBST is reduced from the required voltage value range VR1 to the required voltage value range VR3.

Furthermore, when the voltage demand VREQ indicates that the voltage value of the output voltage VOUT needs to be reduced from the required voltage value range VR1 to the maximum value VR3max in the required voltage value range VR3, in response to the buck control signal SC3, the buck converter 133 does not step down the converted voltage VT. On the other hand, when the voltage demand VREQ indicates that the voltage value of the output voltage VOUT needs to be reduced to the required voltage value range VR3 and be lower than the maximum value VR3max in the required voltage value range VR3, in response to the buck control signal SC3, the buck converter 133 steps down the converted voltage VT.

Figure 3:
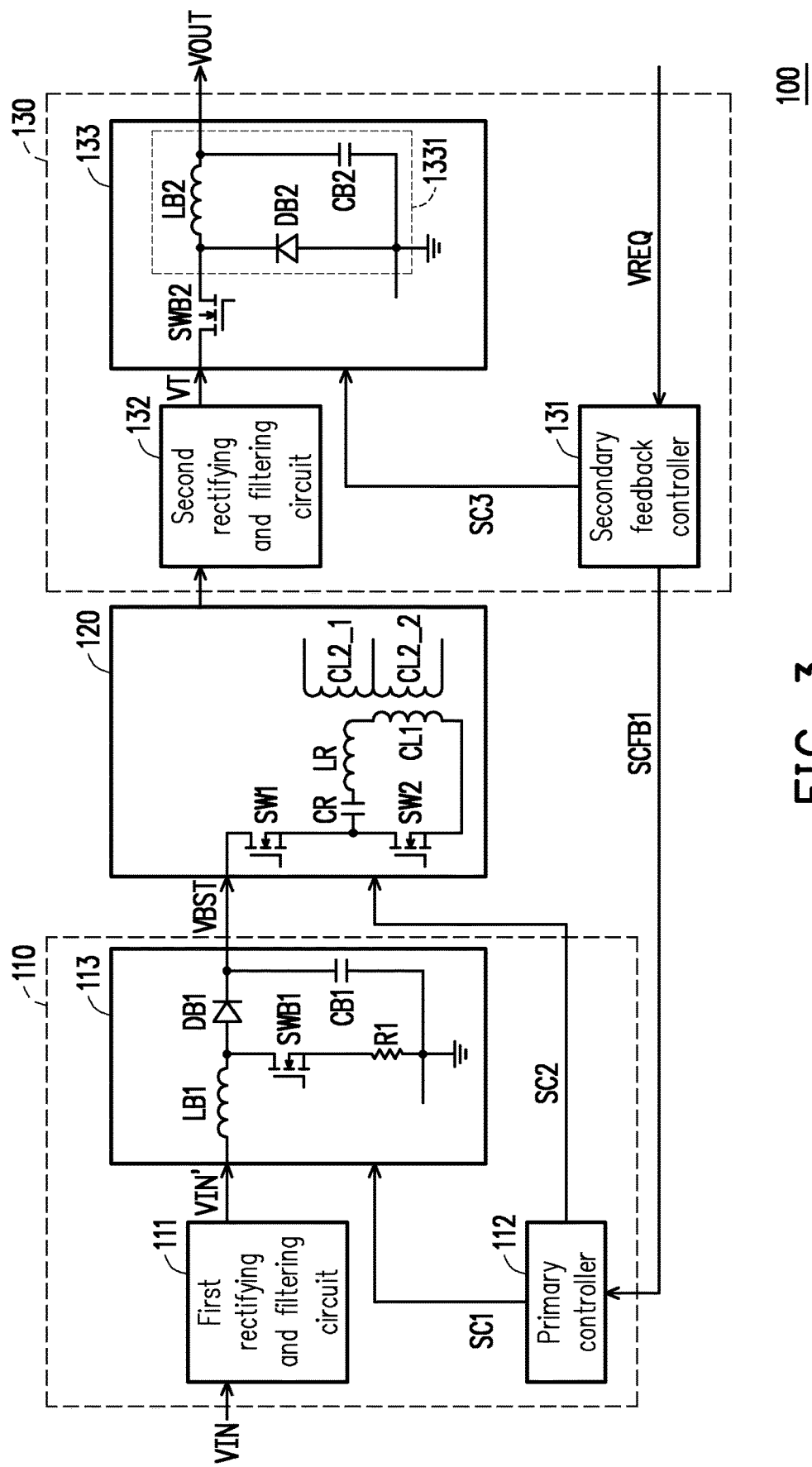
FIG. 3 illustrates a schematic diagram of another voltage transforming device according to the first embodiment of the disclosure.

Referring to FIGS. 2 and 3, FIG. 3 illustrates a schematic diagram of another voltage transforming device according to the first embodiment of the disclosure. FIG. 3 illustrates the circuit configuration of the boost converter 113, the LLC converter 120, and the buck converter 133. In this embodiment, the boost converter 113 includes a boost inductor LB1, a boost diode DB1, a boost condenser CB1, and a boost control switch SWB1. A first terminal of the boost inductor LB1 is coupled to the first rectifying and filtering circuit 111 to receive the adjusted input voltage VIN'. An anode of the boost diode DB1 is coupled to a second terminal of the boost inductor LB1. A first terminal of the boost condenser CB1 is coupled to a cathode of the boost diode DB1. A second terminal of the boost condenser CB1 is coupled to a reference power source (for example, ground). A first terminal of the boost control switch SWB1 is coupled to the second terminal of the boost inductor LB1. A second terminal of the boost control switch SWB1 is coupled to the reference power source. A control terminal of the boost control switch SWB1 is coupled to the primary controller 112 to receive the boost control signal SC1.

In this embodiment, when the voltage demand VREQ indicates that the voltage value of the output voltage VOUT is maintained in the required voltage value range VR1, in response to a first duty cycle of the boost control signal SC1, the boost converter 113 maintains the voltage value of the boosted voltage VBST. When the voltage demand VREQ indicates that the voltage value of the output voltage VOUT needs to be increased from the required voltage value range VR1 to the required voltage value range VR2, in response to a second duty cycle of the boost control signal SC1, the boost converter 113 boosts the voltage value of the boosted voltage VBST. In this embodiment, the second duty cycle is higher than the first duty cycle.

When the voltage demand VREQ indicates that the voltage value of the output voltage VOUT needs to be reduced from the required voltage value range VR1 to the required voltage value range VR3, in response to a third duty cycle of the boost control signal SC1, the boost converter 113 boosts the voltage value of the boosted voltage VBST. In this embodiment, the third duty cycle is lower than the first duty cycle.

In this embodiment, the boost converter 113 further includes a resistor R1. The resistor R1 is coupled between the second terminal of the boost control switch SWB1 and the reference power source. The resistor R1 may be used to limit the current flowing through the first terminal and the second terminal of the boost control switch SWB1. Therefore, the resistor R1 may protect the boost control switch SWB1.

In this embodiment, the LLC converter 120 includes switches SW1 and SW2, a resonance condenser CR, a resonance inductor LR, a primary coil CL1, and secondary coils CL2_1 and CL2_2. A first terminal of the switch SW1 is coupled to the boost converter 113. A first terminal of the switch SW2 is coupled to a second terminal of switch SW1. The switches SW1 and SW2 are controlled by the primary controller 112. In this embodiment, control terminals of the switches SW1 and SW2 are respectively used to receive the conversion control signal SC2. In this embodiment, the primary coil CL1, the resonance condenser CR, and the resonance inductor LR are coupled in series between the second terminal of the switch SW1 and a second terminal of the switch SW2. For example, a first terminal of the resonance condenser CR is coupled to the second terminal of the switch SW1. A first terminal of the resonance inductor LR is coupled to a second terminal of the resonance condenser CR. A first terminal of the primary coil CL1 is coupled to a second terminal of the resonance inductor LR. A second terminal of the primary coil CL1 is coupled to the second terminal of the switch SW2. In this embodiment, the secondary coil CL2_2 and the secondary coil CL2_1 are connected in series. A first terminal of secondary coil CL2_2 is connected to a first terminal of secondary coil CL2_1. The secondary coil CL2_2 and the secondary coil CL2_1 are coupled to the second rectifying and filtering circuit 132. In other words, a second terminal of the secondary coil CL2_2 and a second terminal of the secondary coil CL2_1 are coupled to the second rectifying and filtering circuit 132. In this embodiment, the LLC converter 120 may operate in response to the conversion control signal SC2.

In this embodiment, the buck converter 133 includes a buck control switch SWB2 and a conversion circuit 1331. A first terminal of the buck control switch SWB2 is coupled to the second rectifying and filtering circuit 132 to receive the converted voltage VT. A control terminal of the buck control switch SWB2 is used to receive the buck control signal SC3. The conversion circuit 1331 is coupled to a second terminal of the buck control switch SWB2. The conversion circuit 1331 generates the output voltage VOUT that meets the voltage demand VREQ according to the switching status of the buck control switch SWB2.

In this embodiment, the conversion circuit 1331 includes a buck inductor LB2, a buck condenser CB2, and a buck diode DB2. A first terminal of the buck inductor LB2 is coupled to the second terminal of the buck control switch SWB2. A second terminal of the buck inductor LB2 is used as the output terminal of the voltage transforming device 100. In other words, the voltage transforming device 100 provides the output voltage VOUT through the second terminal of the buck inductor LB2. A first terminal of the buck condenser CB2 is coupled to the second terminal of the buck inductor LB2. A second terminal of the buck condenser CB2 is coupled to the reference power source. A cathode of the buck diode DB2 is coupled to the second terminal of the buck control switch SWB2. An anode of the buck diode DB2 is coupled to the reference power source.

In this embodiment, when the voltage demand VREQ indicates that the output voltage VOUT is the maximum voltage value in one of the required voltage value ranges VR1 to VR3, the buck control switch SWB2 continues to be turned on. In other words, the buck control switch SWB2 continues to be turned on in response to a 100% duty cycle of the buck control signal SC3. Therefore, the voltage value of the output voltage VOUT is substantially equal to the voltage value of the converted voltage VT. On the other hand, when the voltage demand VREQ indicates that the output voltage VOUT is the voltage value in one of the required voltage value ranges VR1 to VR3, and is less than the maximum voltage value of the current required voltage value range, the buck control switch SWB2 switches between being turned on and off in response to the duty cycle of the buck control signal SC3.

In this embodiment, the boost control switch SWB1, the switches SW1 and SW2, and the buck control switch SWB2 are respectively implemented by using an N-type metal-oxide-semiconductor field-effect transistor (MOSFET). The boost control switch SWB1, the switches SW1 and SW2, and the buck control switch SWB2 of the disclosure may be respectively implemented by a suitable transistor switch, and are not limited by the embodiment.

An example is given herein to describe implementation methods of the voltage transforming device 100 in response to different voltage demands VREQ. When the voltage demand VREQ indicates that the voltage value of the output voltage VOUT is 20 volts, the secondary feedback controller 131 determines that 20 volts is the maximum value VR1max of the required voltage value range VR1, and determines that the voltage value of the boosted voltage VBST needs to be increased to 400 volts based on the gain condition. Therefore, the secondary feedback controller 131 provides the first feedback control signal SCFB1 and the buck control signal SC3 corresponding to the voltage demand VREQ. In response to the first feedback control signal SCFB1, the primary controller 112 provides the boost control signal SC1 and the conversion control signal SC2. The boost converter 113 uses the boost control signal SC1 to generate the boosted voltage VBST of 400 volts. In response to the conversion control signal SC2, the LLC converter 120 and the second rectifying and filtering circuit 132 jointly provide the converted voltage VT of 20 volts. In other words, based on the gain condition, the LLC converter 120 and the second rectifying and filtering circuit 132 jointly provide the converted voltage VT of 20 volts. In addition, in response to the buck control signal SC3, the buck converter 133 does not step down the converted voltage VT, thereby providing the output voltage VOUT of 20 volts.

Next, when the voltage demand VREQ indicates that the voltage value of the output voltage VOUT is 15 volts, the secondary feedback controller 131 determines that 15 volts is a maximum value VR3max in the required voltage value range VR3, and determines that the voltage value of the boosted voltage VBST needs to be 300 volts based on the gain condition. Therefore, the secondary feedback controller 131 provides the first feedback control signal SCFB1 and the buck control signal SC3 corresponding to the voltage demand VREQ. In response to the first feedback control signal SCFB1, the primary controller 112 provides the boost control signal SC1 and the conversion control signal SC2. The boost converter 113 uses the boost control signal SC1 to generate the boosted voltage VBST of 300 volts (for example, the boosted voltage VBST is stepped down from 400 volts to 300 volts). In response to the conversion control signal SC2, the LLC converter 120 and the second rectifying and filtering circuit 132 jointly provide the converted voltage VT of 15 volts. In addition, in response to the buck control signal SC3, the buck converter 133 does not step down the converted voltage VT, thereby providing the output voltage VOUT of 15 volts.

Next, when the voltage demand VREQ indicates that the voltage value of the output voltage VOUT is 9 volts, the secondary feedback controller 131 determines that 9 volts is the voltage value in the required voltage value range VR3. 9 volts is less than the maximum value VR3max (i.e., 15 volts) in the required voltage value range VR3. Therefore, the boost converter 113 generates the boosted voltage VBST of 300 volts. The LLC converter 120 uses the conversion control signal SC2 to enable the second rectifying and filtering circuit 132 to output the converted voltage VT of 15 volts. In addition, in response to the buck control signal SC3, the buck converter 133 steps down the converted voltage VT to provide the output voltage VOUT of 9 volts.

When the voltage demand VREQ indicates that the voltage value of the output voltage VOUT is 28 volts, the secondary feedback controller 131 determines that 28 volts is a maximum value VR2max in the required voltage value range VR2, and determines that the voltage value of the boosted voltage VBST needs to be 560 volts based on the gain condition. The boost converter 113 uses the boost control signal SC1 to generate the boosted voltage VBST of 560 volts. The LLC converter 120 uses the conversion control signal SC2 to enable the second rectifying and filtering circuit 132 to output the converted voltage VT of 28 volts. In addition, in response to the buck control signal SC3, the buck converter 133 provides the output voltage VOUT of 28 volts.

In addition, in some embodiments, the LLC converter 120 electrically isolates the primary circuit 110 from the secondary circuit 130. In other words, the primary circuit 110 and the secondary circuit 130 are not physically connected. The electrical isolation method as described above may prevent a user from being hurt or an electronic device connected to the secondary circuit 130 from being damaged by the boosted voltage VBST. In this way, the usage safety of the voltage transforming device 100 may be improved. In this embodiment, the secondary feedback controller 131 may provide the first feedback control signal SCFB1 to the primary controller 112 through wireless communication. For example, the secondary feedback controller 131 may provide the first feedback control signal SCFB1 to the primary controller 112 through optical communication (for example, using photoelectric coupling elements). As another example, the secondary feedback controller 131 may provide the first feedback control signal SCFB1 to the primary controller 112 through an isolation transformer.

Figure 4:
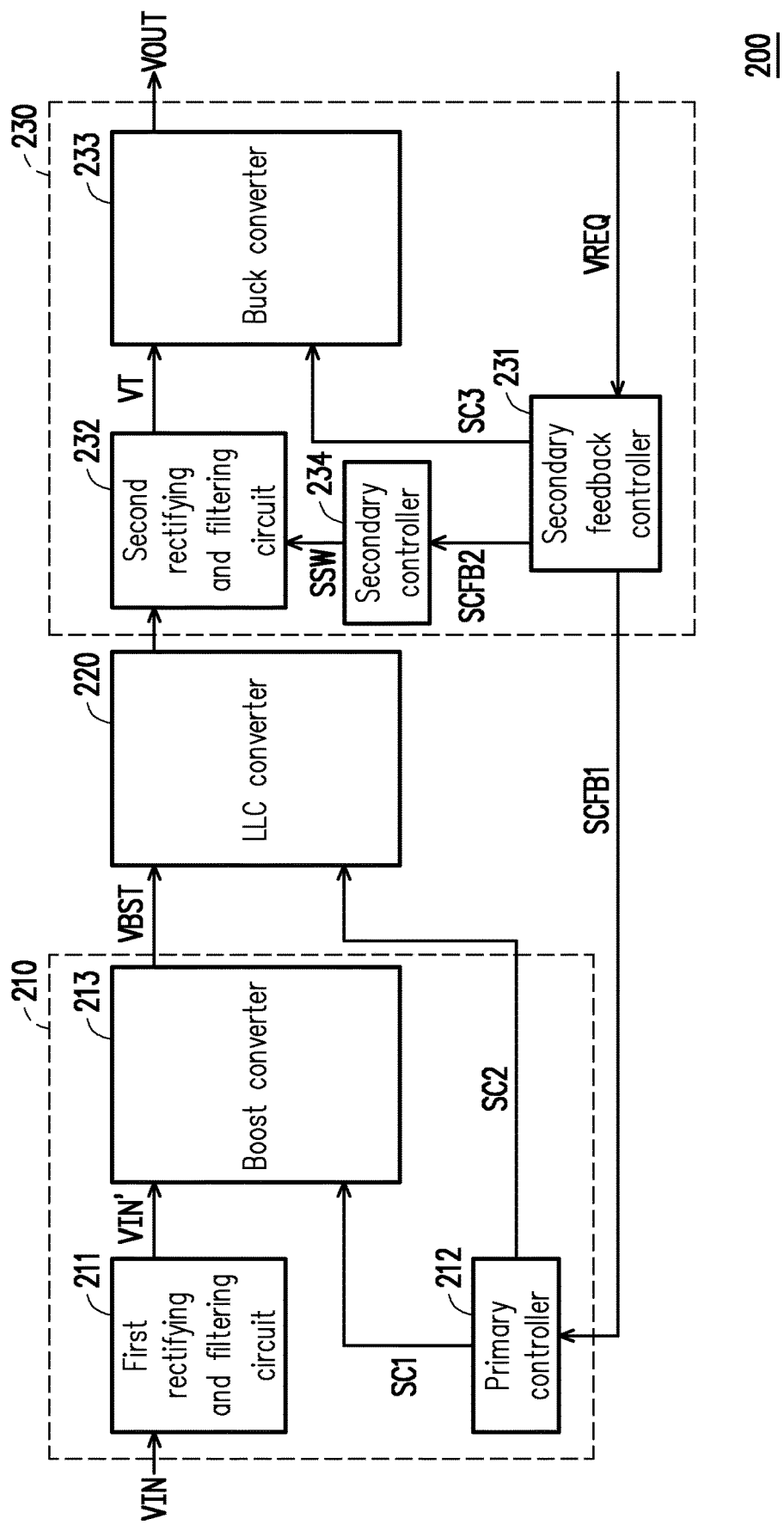
FIG. 4 illustrates a schematic diagram of a voltage transforming device according to the second embodiment of the disclosure.

Referring to FIG. 4, FIG. 4 illustrates a schematic diagram of a voltage transforming device according to the second embodiment of the disclosure. A voltage transforming device 200 includes a primary circuit 210, an LLC converter 220, and a secondary circuit 230. The primary circuit 210 includes a first rectifying and filtering circuit 211, a primary controller 212, and a boost converter 213. The secondary circuit 230 includes a secondary feedback controller 231, a second rectifying and filtering circuit 232, a buck converter 233, and a secondary controller 234. The implementation details of the primary circuit 210 and the LLC converter 220 are roughly similar to those of the primary circuit 110 and the LLC converter 120 of the first embodiment, so details thereof will not be repeated herein.

In this embodiment, the secondary controller 234 is coupled between the secondary feedback controller 231 and the second rectifying and filtering circuit 232. In this embodiment, in response to the voltage demand VREQ, the secondary feedback controller 231 further provides a second feedback control signal SCFB2. In other words, the secondary feedback controller 231 provides the first feedback control signal SCFB1, the second feedback control signal SCFB2, and the buck control signal SC3. The secondary controller 234 receives the second feedback control signal SCFB2, and provides a switching signal SSW according to the second feedback control signal SCFB2. The second rectifying and filtering circuit 232 operates in response to the switching signal SSW.

Figure 5:
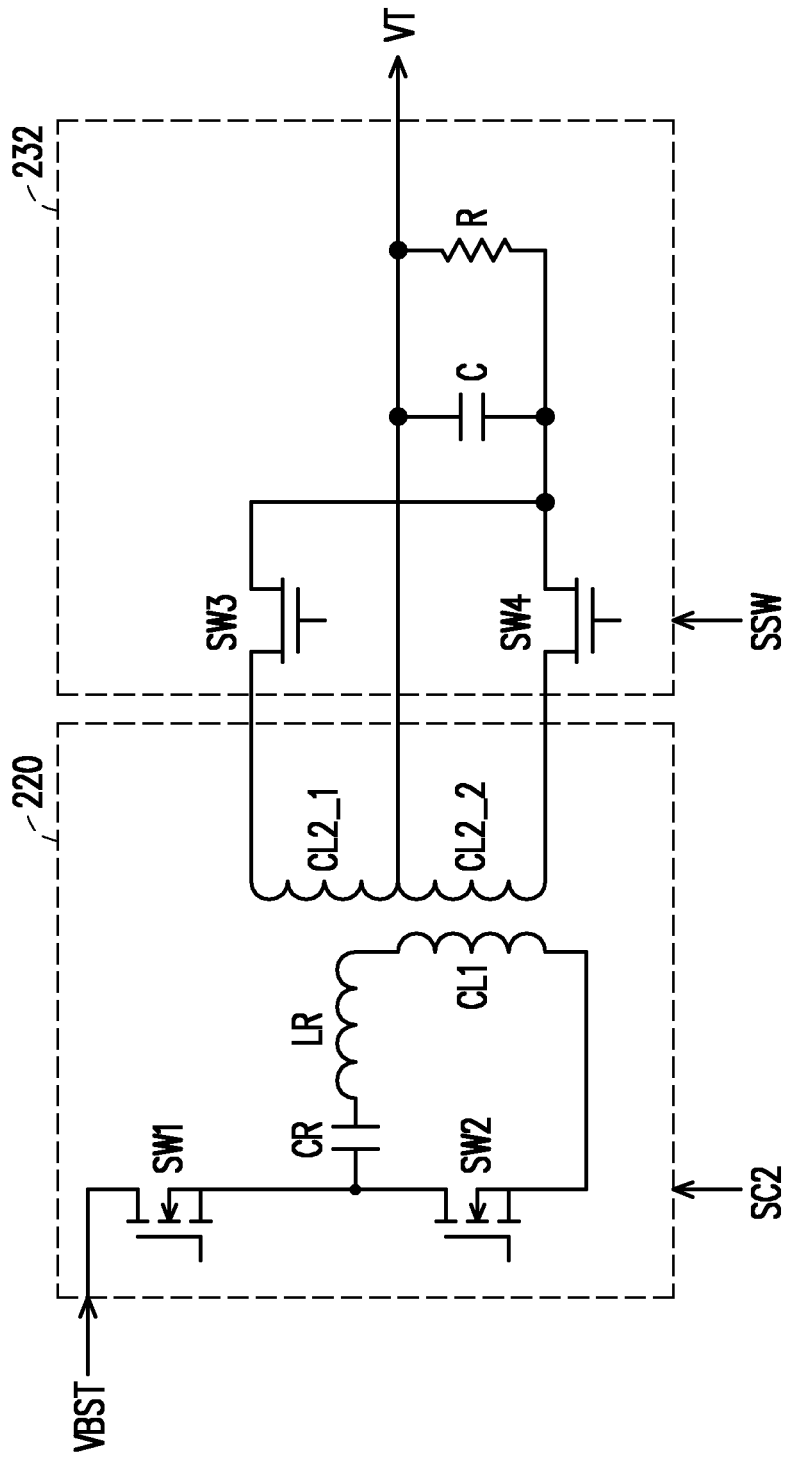
FIG. 5 illustrates a schematic diagram of an LLC converter and a second rectifying and filtering circuit according to the second embodiment of the disclosure.

Referring to FIGS. 4 and 5, FIG. 5 illustrates a schematic diagram of an LLC converter and a second rectifying and filtering circuit according to the second embodiment of the disclosure. In this embodiment, the second rectifying and filtering circuit 232 includes switches SW3 and SW4, a condenser C, and a resistor R. A first terminal of the switch SW3 is coupled to the secondary terminal of the secondary coil CL2_1. A first terminal of the switch SW4 is coupled to a second terminal of the switch SW3. A second terminal of the switch SW4 is coupled to the second terminal of the secondary coil CL2_2. The switches SW3 and SW4 are controlled by the switching signal SSW. A first terminal of the condenser C is coupled to the first terminal of secondary coil CL2_1. A second terminal of the condenser C is coupled to the second terminal of switching SW4. The resistor R and the condenser C are connected in parallel. In this embodiment, the secondary feedback controller 231 may provide the first feedback control signal SCFB1 and the second feedback control signal SCFB2 based on the gain condition. Therefore, the LLC converter 220 and the second rectifying and filtering circuit 232 jointly convert the boosted voltage VBST to provide the converted voltage VT. In addition, the second rectifying and filtering circuit 232 may further perform synchronous rectifying and filtering operations. In other words, the LLC converter 220 and the second rectifying and filtering circuit 232 may be regarded as an LLC synchronous rectification converter.

In this embodiment, the switches SW3 and SW4 may respectively be implemented by a suitable transistor switch, and are not limited to the embodiment.

In some embodiments, the LLC converter 220 may further include the switches SW3 and SW4, the condenser C, and the resistor R. That is, the LLC converter 220 may be an LLC synchronous rectification converter. The second rectifying and filtering circuit 232 includes an additional rectifier and filter.

Figure 6:
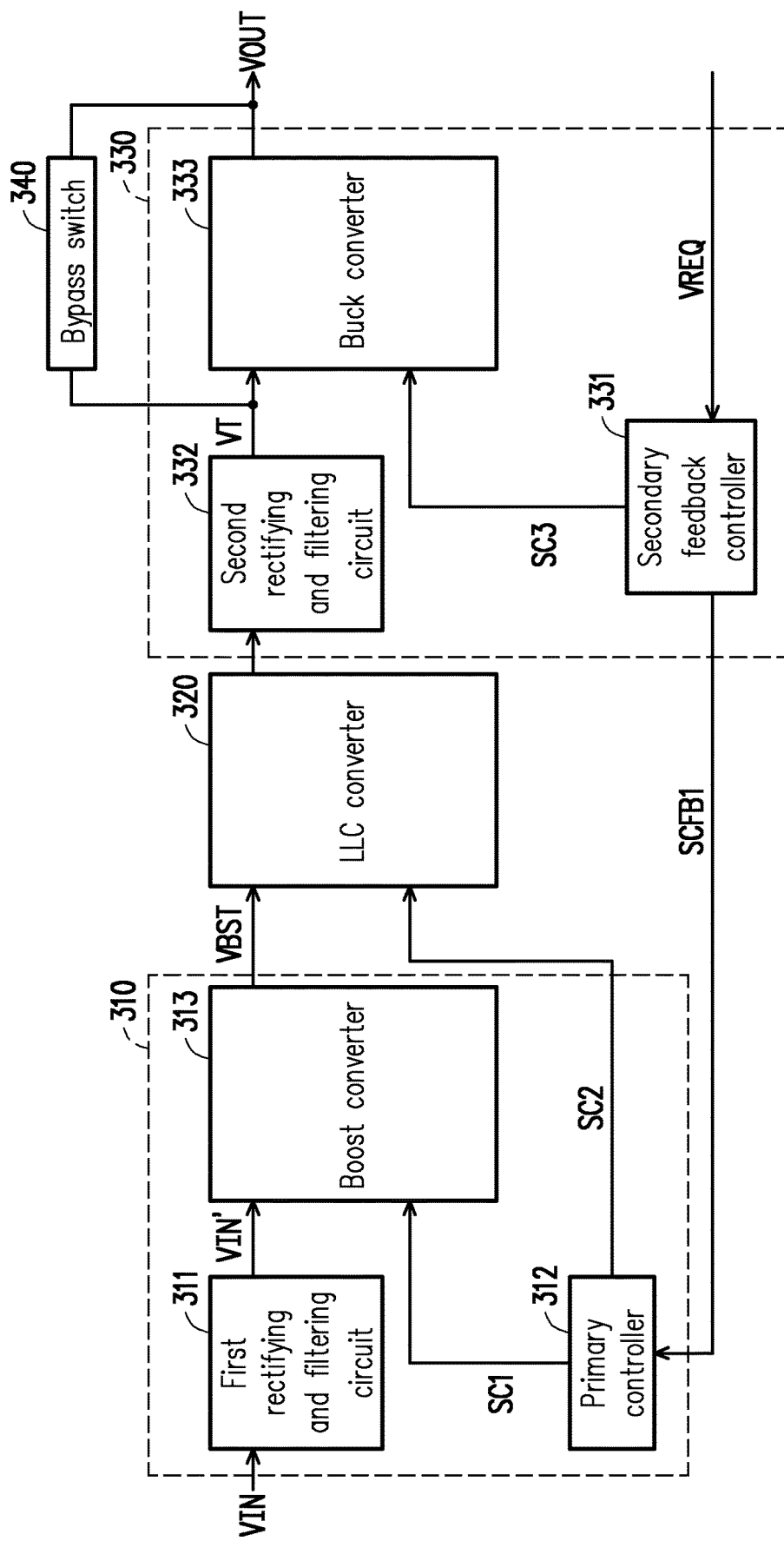
FIG. 6 illustrates a schematic diagram of a voltage transforming device according to the third embodiment of the disclosure.

Referring to FIG. 6, FIG. 6 illustrates a schematic diagram of a voltage transforming device according to the third embodiment of the disclosure. In this embodiment, a voltage transforming device 300 includes a primary circuit 310, an LLC converter 320, a secondary circuit 330, and a bypass switch 340. The primary circuit 310 includes a first rectifying and filtering circuit 311, a primary controller 312, and a boost converter 313. The secondary circuit 330 includes a secondary feedback controller 331, a second rectifying and filtering circuit 332, and a buck converter 333. The implementation details of the primary circuit 310 and the LLC converter 320 are generally similar to those of the primary circuit 110 and the LLC converter 120 of the first embodiment, so details thereof will not be repeated herein. In this embodiment, the bypass switch 340 is coupled between the second rectifying and filtering circuit 332 and an output terminal of the voltage transforming device 300, and is connected in parallel with the buck converter 333. In this embodiment, the bypass switch 340 may be controlled by the secondary feedback controller 331. When the voltage demand VREQ indicates that the output voltage VOUT is the maximum voltage value in the required voltage value range, the secondary feedback controller 331 disables the buck converter 333 and turns on the bypass switch 340. In this way, the service life of the buck converter 333 may be extended. In this embodiment, the bypass switch 340 may be implemented by at least one of a transmission gate, a transistor switch, and a relay.

For example, when the voltage demand VREQ indicates that the voltage value of the output voltage VOUT is 28 volts, the secondary feedback controller 331 determines that 28 volts is the maximum value in the required voltage value range, and determines that the voltage value of the boosted voltage VBST needs to be increased to 560 volts based on the gain condition. Therefore, the secondary feedback controller 331 provides the first feedback control signal SCFB1 to control the boosted voltage VBST to have a voltage value of 560 volts and control the converted voltage VT to have a voltage value of 28 volts. In addition, the secondary feedback controller 331 provides the buck control signal SC3 to disable the buck converter 333 and turn on the bypass switch 340. Therefore, the output voltage VOUT is 28 volts.

On the other hand, when the voltage demand VREQ indicates that the output voltage VOUT has a voltage value in the required voltage value range and is less than the maximum voltage value in the current required voltage value range, the secondary feedback controller 331 enables the buck converter 333 and turns off the bypass switch 340.

In summary, in the voltage transforming device of the disclosure, the second rectifying and filtering circuit and the LLC converter jointly convert the boosted voltage based on the fixed gain condition to provide the converted voltage. Therefore, the high efficiency of the voltage transforming device may be maintained. The buck converter may convert the converted voltage into the output voltage. Therefore, the voltage transforming device may generate the output voltage corresponding to the voltage demand based on the voltage demand. In this way, based on the gain condition, no matter what the output voltage is, the high efficiency of the voltage transforming device may be maintained. The voltage transforming device of the disclosure may meet the efficiency specification and the current power delivery requirements. In addition, based on the joint operation of the primary circuit, the LLC converter, and the secondary circuit, the voltage transforming device of the disclosure may provide an output voltage that meets any voltage demand of an application. Compared with the conventional configuration, the voltage transforming device of the disclosure does not require a plurality of transformer elements to meet various output voltages of an application. Therefore, compared with the conventional configuration, the volume of the voltage transforming device of the disclosure is smaller.

Although the disclosure has been disclosed in the above by way of embodiments, the embodiments are not intended to limit the disclosure. Those with ordinary knowledge in the technical field can make various changes and modifications without departing from the spirit and scope of the disclosure. Therefore, the scope of protection of the disclosure is defined by the scope of the appended claims.

What is claimed is:

1. A voltage transforming device, comprising:
   a primary circuit, comprising:
   a first rectifying and filtering circuit, configured to rectify and filter an input voltage to provide an adjusted input voltage;
   a primary controller, coupled to the first rectifying and filtering circuit, configured to provide a boost control signal in response to a first feedback control signal; and
   a boost converter, coupled to the first rectifying and filtering circuit and the primary controller, configured to boost the adjusted input voltage to generate a boosted voltage in response to the boost control signal;
   an LLC converter, coupled to the boost converter; and
   a secondary circuit, comprising:
   a secondary feedback controller, configured to receive a voltage demand and provide the first feedback control signal and a buck control signal in response to the voltage demand;
   a second rectifying and filtering circuit, coupled to the LLC converter, configured to jointly convert the boosted voltage with the LLC converter based on a fixed gain condition to provide a converted voltage; and
   a buck converter, coupled to the second rectifying and filtering circuit, configured to convert the converted voltage to provide an output voltage in response to the buck control signal,
   wherein the buck converter comprises:
   a buck control switch, wherein a first terminal of the buck control switch is coupled to the second rectifying and filtering circuit to receive the converted voltage, wherein a control terminal of the buck control switch is configured to receive the buck control signal; and
   a conversion circuit, coupled to a second terminal of the buck control switch, configured to generate the output voltage according to a switching status of the buck control switch,
   wherein when the voltage demand indicates that the output voltage is a maximum voltage value in a first required voltage value range, the buck control switch continues to be turned on, and
   wherein when the voltage demand indicates that the output voltage is a voltage value in the first required voltage value range and is less than the maximum voltage value in the first required voltage value range, the buck control switch switches between being turned on and off in response to a duty cycle of the buck control signal.

2. The voltage transforming device according to claim 1, wherein the secondary feedback controller determines that a voltage value of the output voltage is in one of a plurality of required voltage value ranges based on the voltage demand to derive a determination result, and provides the first feedback control signal and the buck control signal according to the determination result.

3. The voltage transforming device according to claim 1, wherein when the voltage demand indicates that a voltage value of the output voltage is maintained in the first required voltage value range, the boost converter maintains a voltage value of the boosted voltage in response to the boost control signal.

4. The voltage transforming device according to claim 1, wherein when the voltage demand indicates that a voltage value of the output voltage needs to be reduced and maintained in a same required voltage value range, the boost converter maintains a voltage value of the boosted voltage in response to the boost control signal, and the buck converter steps down the converted voltage in response to the buck control signal.

5. The voltage transforming device according to claim 1, wherein when the voltage demand indicates that a voltage value of the output voltage needs to be increased from the first required voltage value range to a second required voltage value range, the boost converter increases a voltage value of the boosted voltage in response to the boost control signal.

6. The voltage transforming device according to claim 1, wherein when the voltage demand indicates that a voltage value of the output voltage needs to be reduced from the first required voltage value range to a third required voltage value range, the boost converter reduces a voltage value of the boosted voltage in response to the boost control signal.

7. The voltage transforming device according to claim 1, further comprising:
   a bypass switch, coupled between the second rectifying and filtering circuit and an output terminal of the voltage transforming device, connected in parallel with the buck converter.

8. The voltage transforming device according to claim 7, wherein:
   when the voltage demand indicates that the output voltage is the maximum voltage value in the first required voltage value range, the secondary feedback controller disables the buck converter and turns on the bypass switch.

9. The voltage transforming device according to claim 8, wherein:
   when the voltage demand indicates that the output voltage is a voltage value in the first required voltage value range and is less than the maximum voltage value in the first required voltage value range, the secondary feedback controller enables the buck converter and turns off the bypass switch.

10. The voltage transforming device according to claim 1, wherein the boost converter comprises:
a boost inductor, wherein a first terminal of the boost inductor is coupled to the first rectifying and filtering circuit;
a boost diode, wherein an anode of the boost diode is coupled to a second terminal of the boost inductor;
a boost condenser, wherein a first terminal of the boost condenser is coupled to a cathode of the boost diode, and a second terminal of the boost condenser is coupled to a reference power source; and
a boost control switch, wherein a first terminal of the boost control switch is coupled to the second terminal of the boost inductor, a second terminal of the boost control switch is coupled to the reference power source, wherein a control terminal of the boost control switch is coupled to the primary controller to receive the boost control signal.

11. The voltage transforming device according to claim 10, wherein when the voltage demand indicates that a voltage value of the output voltage is maintained in the first required voltage value range, the boost converter maintains a voltage value of the boosted voltage in response to a first duty cycle of the boost control signal.

12. The voltage transforming device according to claim 11, wherein:
when the voltage demand indicates that the voltage value of the output voltage needs to be increased from the first required voltage value range to a second required voltage value range, the boost converter increases the voltage value of the boosted voltage in response to a second duty cycle of the boost control signal, and
the second duty cycle is higher than the first duty cycle.

13. The voltage transforming device according to claim 12, wherein:
when the voltage demand indicates that the voltage value of the output voltage needs to be reduced from the first required voltage value range to a third required voltage value range, the boost converter reduces the voltage value of the boosted voltage in response to a third duty cycle of the boost control signal, and
the third duty cycle is lower than the first duty cycle.

14. The voltage transforming device according to claim 1, wherein the LLC converter comprises:
a first switch, wherein a first terminal of the first switch is coupled to the boost converter;
a second switch, wherein a first terminal of the second switch is coupled to a second terminal of the first switch, wherein the first switch and the second switch are controlled by the primary controller;
a resonance condenser;
a resonance inductor;
a primary coil, wherein the primary coil, the resonance condenser, and the resonance inductor are coupled in series between the first terminal of the second switch and a second terminal of the second switch;
a first secondary coil; and
a second secondary coil, connected in series with the first secondary coil, coupled to the second rectifying and filtering circuit with the first secondary coil.

15. The voltage transforming device according to claim 14, wherein a first terminal of the first secondary coil is coupled to a first terminal of the second secondary coil, and the second rectifying and filtering circuit comprises:

a third switch, wherein a first terminal of the third switch is coupled to a second terminal of the first secondary coil;
a fourth switch, wherein a first terminal of the fourth switch is coupled to a second terminal of the third switch, wherein a second terminal of the fourth switch is coupled to a second terminal of the second secondary coil, wherein the third switch and the fourth switch are controlled by a switching signal;
a condenser, wherein a first terminal of the condenser is coupled to the first terminal of the first secondary coil, and a second terminal of the condenser is coupled to the first terminal of the fourth switch; and
a resistor, connected in parallel with the condenser.

16. The voltage transforming device according to claim 15, wherein:
the secondary feedback controller is further configured to provide the first feedback control signal, a second feedback control signal, and the buck control signal in response to the voltage demand, and
the secondary circuit further comprises:
a secondary controller, coupled between the secondary feedback controller and the second rectifying and filtering circuit, configured to receive the second feedback control signal and provide the switching signal according to the second feedback control signal.

17. The voltage transforming device according to claim 1, wherein:
the LLC converter electrically isolates the primary circuit from the secondary circuit, and
the secondary feedback controller communicates with the primary controller through wireless communication.

18. A voltage transforming device, comprising:
a primary circuit, comprising:
a first rectifying and filtering circuit, configured to rectify and filter an input voltage to provide an adjusted input voltage;
a primary controller, coupled to the first rectifying and filtering circuit, configured to provide a boost control signal in response to a first feedback control signal; and
a boost converter, coupled to the first rectifying and filtering circuit and the primary controller, configured to boost the adjusted input voltage to generate a boosted voltage in response to the boost control signal;
an LLC converter, coupled to the boost converter; and
a secondary circuit, comprising:
a secondary feedback controller, configured to receive a voltage demand and provide the first feedback control signal and a buck control signal in response to the voltage demand;
a second rectifying and filtering circuit, coupled to the LLC converter, configured to jointly convert the boosted voltage with the LLC converter based on a fixed gain condition to provide a converted voltage; and
a buck converter, coupled to the second rectifying and filtering circuit, configured to convert the converted voltage to provide an output voltage in response to the buck control signal,
wherein the boost converter comprises:
a boost inductor, wherein a first terminal of the boost inductor is coupled to the first rectifying and filtering circuit;
a boost diode, wherein an anode of the boost diode is coupled to a second terminal of the boost inductor;
a boost condenser, wherein a first terminal of the boost condenser is coupled to a cathode of the boost diode, and a second terminal of the boost condenser is coupled to a reference power source; and a boost control switch, wherein a first terminal of the boost control switch is coupled to the second terminal of the boost inductor, a second terminal of the boost control switch is coupled to the reference power source, wherein a control terminal of the boost control switch is coupled to the primary controller to receive the boost control signal, wherein when the voltage demand indicates that a voltage value of the output voltage is maintained in a first required voltage value range, the boost converter maintains a voltage value of the boosted voltage in response to a first duty cycle of the boost control signal, wherein when the voltage demand indicates that the voltage value of the output voltage needs to be increased from the first required voltage value range to a second required voltage value range, the boost converter increases the voltage value of the boosted voltage in response to a second duty cycle of the boost control signal, and wherein the second duty cycle is higher than the first duty cycle.

19. A voltage transforming device, comprising:

a primary circuit, comprising:

a first rectifying and filtering circuit, configured to rectify and filter an input voltage to provide an adjusted input voltage;

a primary controller, coupled to the first rectifying and filtering circuit, configured to provide a boost control signal in response to a first feedback control signal; and a boost converter, coupled to the first rectifying and filtering circuit and the primary controller, configured to boost the adjusted input voltage to generate a boosted voltage in response to the boost control signal;

an LLC converter, coupled to the boost converter; and a secondary circuit, comprising:

a secondary feedback controller, configured to receive a voltage demand and provide the first feedback control signal and a buck control signal in response to the voltage demand;

a second rectifying and filtering circuit, coupled to the LLC converter, configured to jointly convert the boosted voltage with the LLC converter based on a fixed gain condition to provide a converted voltage; and a buck converter, coupled to the second rectifying and filtering circuit, configured to convert the converted voltage to provide an output voltage in response to the buck control signal, wherein the LLC converter comprises:

a first switch, wherein a first terminal of the first switch is coupled to the boost converter;

a second switch, wherein a first terminal of the second switch is coupled to a second terminal of the first switch, wherein the first switch and the second switch are controlled by the primary controller;

a resonance condenser;

a resonance inductor;

a primary coil, wherein the primary coil, the resonance condenser, and the resonance inductor are coupled in series between the first terminal of the second switch and a second terminal of the second switch;

a first secondary coil; and a second secondary coil, connected in series with the first secondary coil, coupled to the second rectifying and filtering circuit with the first secondary coil, wherein a first terminal of the first secondary coil is coupled to a first terminal of the second secondary coil, and the second rectifying and filtering circuit comprises:

a third switch, wherein a first terminal of the third switch is coupled to a second terminal of the first secondary coil;

a fourth switch, wherein a first terminal of the fourth switch is coupled to a second terminal of the third switch, wherein a second terminal of the fourth switch is coupled to a second terminal of the second secondary coil, wherein the third switch and the fourth switch are controlled by a switching signal;

a condenser, wherein a first terminal of the condenser is coupled to the first terminal of the first secondary coil, and a second terminal of the condenser is coupled to the first terminal of the fourth switch; and a resistor, connected in parallel with the condenser, wherein the secondary feedback controller is further configured to provide the first feedback control signal, a second feedback control signal, and the buck control signal in response to the voltage demand, and wherein the secondary circuit further comprises:

a secondary controller, coupled between the secondary feedback controller and the second rectifying and filtering circuit, configured to receive the second feedback control signal and provide the switching signal according to the second feedback control signal.

* * * * *